United States Patent
Serra

[15] 3,684,303
[45] Aug. 15, 1972

[54] DEVICE FOR LOCKING A TOOL ON A SPINDLE OF A MACHINE TOOL

[72] Inventor: Primo Serra, Ivrea, Turin, Italy
[73] Assignee: Ing. C. Olivetti & C., S.p.A., Turin, Italy
[22] Filed: Jan. 15, 1971
[21] Appl. No.: 106,862

[30] Foreign Application Priority Data
  Jan. 16, 1970  Italy.....................67128 A/70

[52] U.S. Cl........................279/82, 279/89, 90/11 A
[51] Int. Cl. ........................................B23b 31/06
[58] Field of Search........279/82, 89, 90, 76; 90/11 A

[56] References Cited
UNITED STATES PATENTS
3,551,974  1/1971  Fantoni.................90/11 A X
3,152,811  10/1964  Perrin.........................279/82

*Primary Examiner*—Gil Weidenfeld
*Attorney*—Birch, Swindler, McKie & Beckett

[57] ABSTRACT

Apparatus for locking a shank of a tool to a spindle of a machine tool device comprising first and second sets of balls housed in radial recesses of a bushing which is slidable relative to the spindle and is housed within a fixed sleeve. A rod is provided within the bushing to drive the first set of balls into recesses in the tool shank. The rod includes a tapered conical section which cooperates with a conical section of the sleeve to cam the second balls into position in the bushing so that the bushing moves with the rod but at reduced speed relative to the speed of movement of the rod.

6 Claims, 3 Drawing Figures

DEVICE FOR LOCKING A TOOL ON A SPINDLE OF A MACHINE TOOL

BACKGROUND OF THE INVENTION

This invention relates to a device for locking a tool onto a spindle of a machine tool and adapted to be utilized on machines in which a tool change is effected in a fully automatic manner and in a very short time.

The tool locking devices of the prior art are normally housed inside the spindle. They are provided with means which are adapted in a first stage of operation to engage a conical shank of the tool within a conical seat provided in the spindle. In a second stage of operation, these means exert an axial force of traction on the shank in order to closely couple the shank into the conical seat of the spindle. These devices, which are operated by a rod slidably mounted inside the spindle, essentially comprise a bushing adapted to slide axially relative to both the spindle and the rod to which the bushing is resiliently connected by means of a spring which urges the bushing against a stop on the spindle. On the end of the rod, which protrudes into the conical seat of the spindle, seats of substantially spherical shape are provided, in each of which, in the unlocked position of the tool, a corresponding ball is partially housed. The balls are retained in corresponding holes of the bushing. The conical shank of the tool is provided with an axial hole adapted to mate with the end portion of the bushing. The inside of the shank's axial hole is formed with an annular groove which corresponds to the holes of the bushings.

When no tool is mounted on the spindle, the bushing rests against the stop of the spindle and the rod is held in a position relative to the bushing which allows the balls to retract into the seats provided in the rod. However, when the tool is mounted on the spindle, an axial movement is imparted to the rod to retract the rod from the tool. During the first stage of such movement, the spring holds the bushing against the stop of the spindle and, due to the relative movement of the rod with respect to the bushing, the balls are forced out of the seats of the rod and into the annular groove in the shank of the tool.

As the movement of the rod continues, a projecting part thereof engages a corresponding part on the bushing, causing entrainment of the bushing with the rod. During this second stage of the movement, any backlash existing between the balls and the annular groove in the shank of the tool is taken up, and an axial pull is imparted to the tool in order to draw the tool shank securely into the conical seat of the spindle.

However, such known devices for locking the tool on the spindle of a machine tool suffer from the disadvantage that the shank of the tool is pulled into the seat of the spindle, in general, with a rather high speed. Therefore, considerable shocks occur which may cause serious damage. In fact, the speed with which the tool is pulled into the seat on the spindle is the same as the speed of movement of the rod, since the latter is entrained with the bushing during the second stage of movement of the rod. On the other hand, the rod cannot feasibly be moved slowly enough to reduce the shocks substantially, since the time required for locking the tool would then be too long.

SUMMARY OF THE INVENTION

An object of the present invention is to avoid or minimize the above problem.

According to the present invention, a device is provided for locking a tool on the spindle of a machine tool which drives the tool about an axis of rotation. The device includes a rod coaxial with the spindle and adapted to be displaced relative to the spindle in an axial direction. A bushing surrounds a portion of the rod coaxial therewith and is adapted to be displaced relative to both the spindle and the rod. A first set of balls is normally housed in corresponding radial holes of the bushing. They are radially movable into corresponding holes of the tool to lock the tool to the spindle. A second set of balls is housed in corresponding holes of the bushing and rest against and may ride over a section of the rod. A first cam is provided integral with the rod at one end of this section. This cam cooperates with a second cam carried by a sleeve which surrounds a portion of the bushing and is stationary relative to the spindle to cause the second balls to be displaced both radially and axially relative to the spindle. As a result the bushing is carried along with the rod, but at a reduced speed relative thereto.

BRIEF DESCRIPTION OF THE DRAWINGS

The invention will be described in more detail, by way of example, with reference to the accompanying drawings, in which.

DESCRIPTION OF PREFERRED EMBODIMENTS

Figure 1:
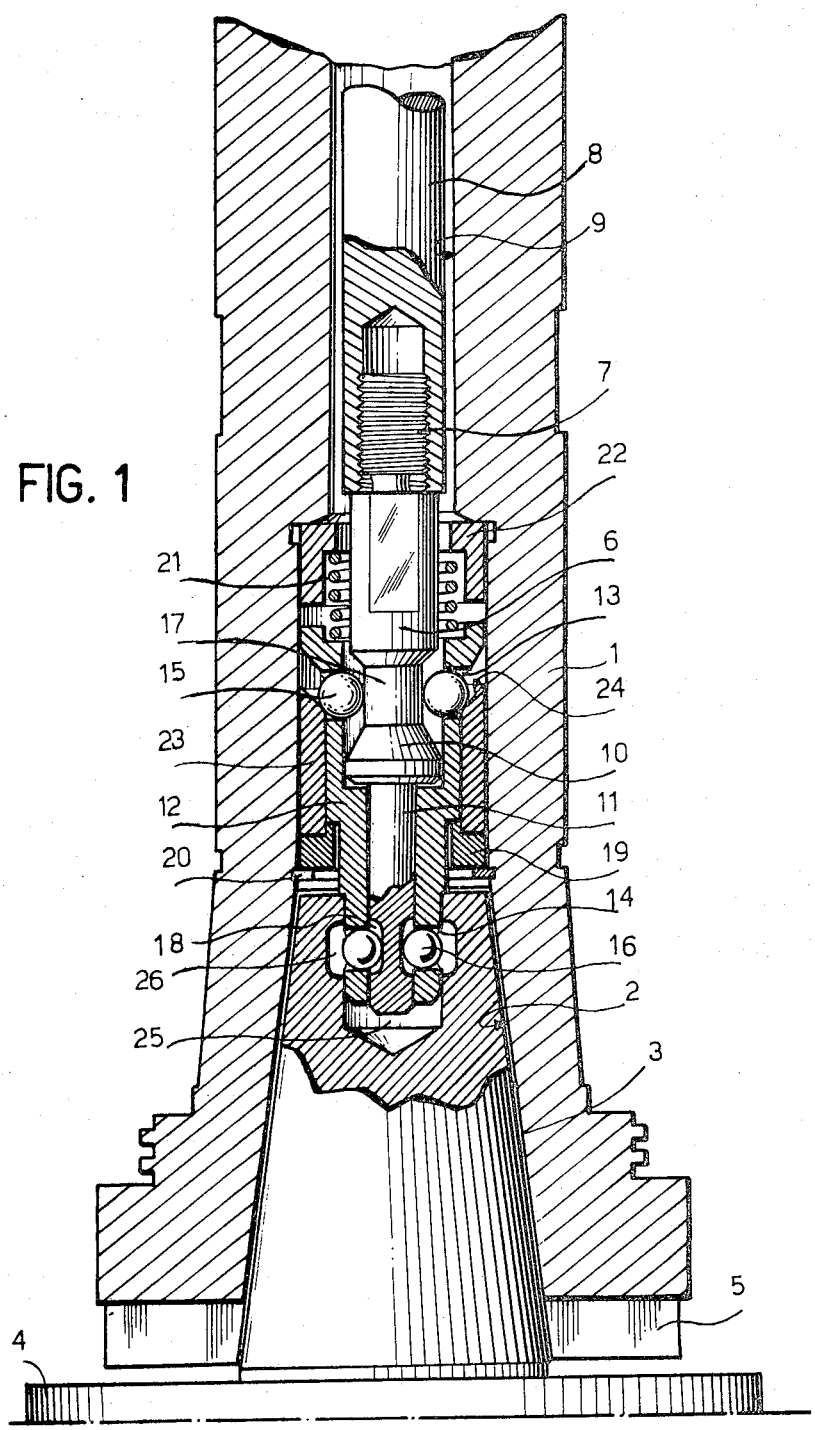
FIG. 1 shows a vertical section through the device in its unlocked position with a tool inserted in a seat in the spindle.

Referring to FIG. 1, a locking device in accordance with this invention is disposed inside a spindle 1 of a machine tool. During the operation of the machine tool, the spindle 1, supported on bearings (not shown), is rotated about its own axis. The spindle is provided with a conical seat 2 adapted to receive a conical shank 3 of a tool or a toolholder 4. Preferably, the end face of the spindle (at the bottom in the drawings) has dogs 5 for coupling with corresponding recesses or teeth (not shown) of the tool or toolholder 4.

The locking device of the invention comprises a drive rod 6 which has one end 7 screwed into the end of a rod 8 adapted to slide inside a hole 9 in the spindle 1. The rod 6 includes a tapered conical section 10 and a cylindrical pin 11 which is adapted to slide in a bushing 12 provided with two sets of radial holes, 13 and 14 respectively, inside which balls 15 and 16 respectively are housed.

When the device is in its rest position (FIG. 1), the balls 15 rest upon a cylindrical section 17 of the rod 6, while the balls 16 are retracted into seats 18 in the pin 11. The bushing 12 rests upon a ring 19 which is axially fastened to the spindle 1 by a spring ring 20. The bushing 12 is biased against the ring 19 by a coil spring 21, one of whose ends bears upon the bushing while the other end bears against a ring 22 which abuts a shoulder of the spindle.

The bushing 12 can move axially inside a sleeve 23 which is stationary relative to the spindle and also rests upon the ring 19. The sleeve 23 is provided with a conical seat 24 which is substantially in correspondence with the radial holes 13 of the bushing 12 and upon which the balls 15 bear.

The shank 3 of the tool 4 is provided with a hole 25 adapted to mate with the outer surface of the bushing 12 and with an annular groove 26 which, when the tool holder is inserted into the spindle 1, is substantially in correspondence with the balls 16.

Considering the operation of the invention, assume first that the device is in its unlocked position as shown in FIG. 1. In this position, the bushing 12 rests upon the ring 19, against which it is biased by the spring 21. The relative position of the rod 6 with respect to the bushing 12 is as shown in FIG. 1, i.e., the seats 18 of the pin 11 are aligned with the radial holes 14 in the bushing and the balls 15 rest against the cylindrical section 17. This position of the drive rod 6 relative to the bushing 12 is obtained by displacing the rod 8 with respect to the spindle 1 in a manner described below.

When the device is in its unlocked position described above, the shank 3 of the tool (or toolholder) 4 can be inserted inside the corresponding conical seat 2 of the spindle 1. This insertion operation is normally effected in a fully automatic manner, i.e., by axially displacing, with known means, the spindle 1 relative to the tool 4, or vice versa.

Figure 2:
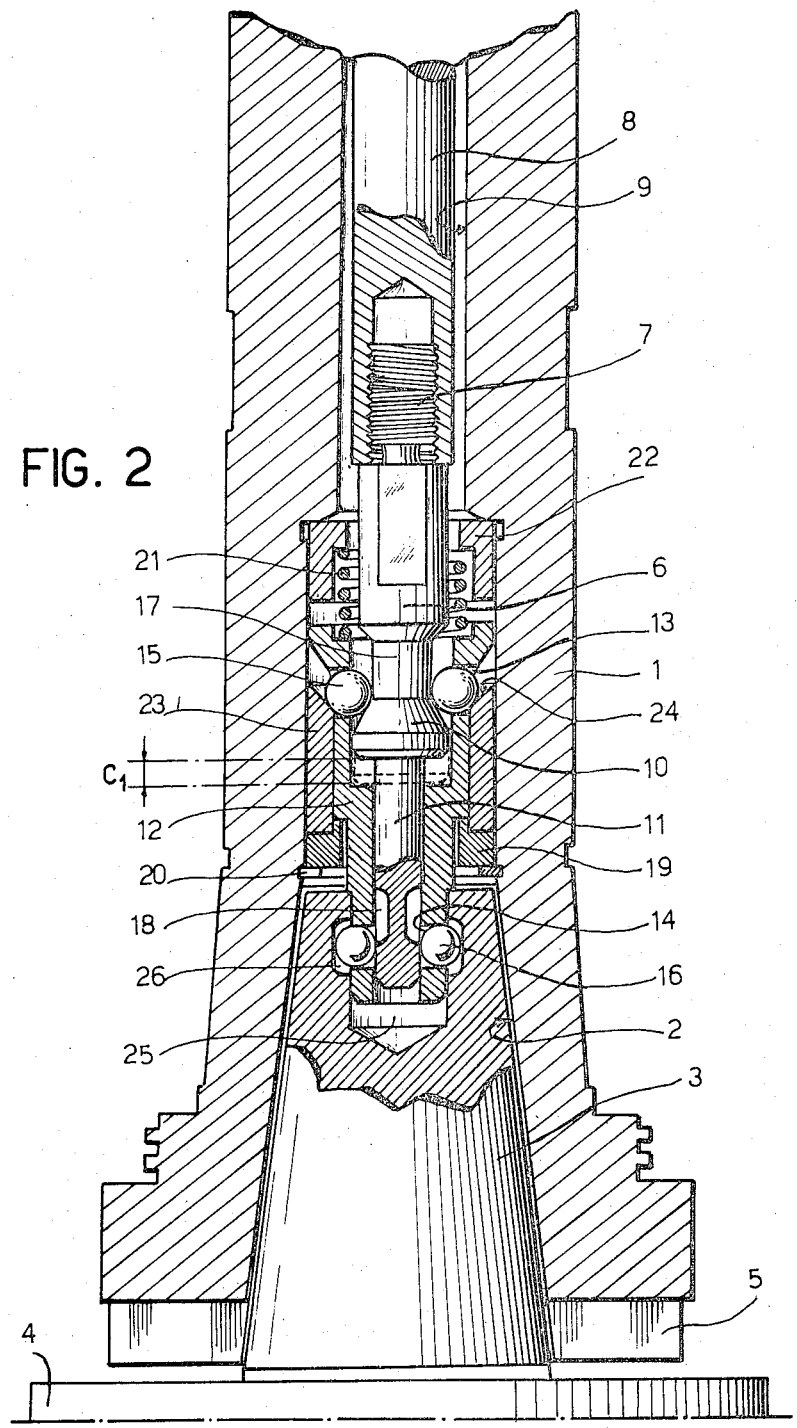
FIG. 2 shows a section of the device similar to that of FIG. 1, at the end of a first stage of operation of the device.

In order to lock the tool, the rod 8 is withdrawn from the tool 4. During the first stage of displacement of the rod 8 and the rod 6 which is integral therewith, the bushing 12 remains in contact with the ring 19. Due to the movement of the pin 11 relative to the bushing 12, the balls 16 are cammed out of the seats 18 and urged in the radial direction into the annular groove 26 of the shank 3. At the end of this first stage of the displacement, during which the rod 8 and the drive rod 6 execute a stroke $C_1$ (FIG. 2), the cone 10 of the column 6 contacts the balls 15. The relative positions assumed by the various components of the locking device at the end of this first stage of displacement are shown in FIG. 2.

Figure 3:
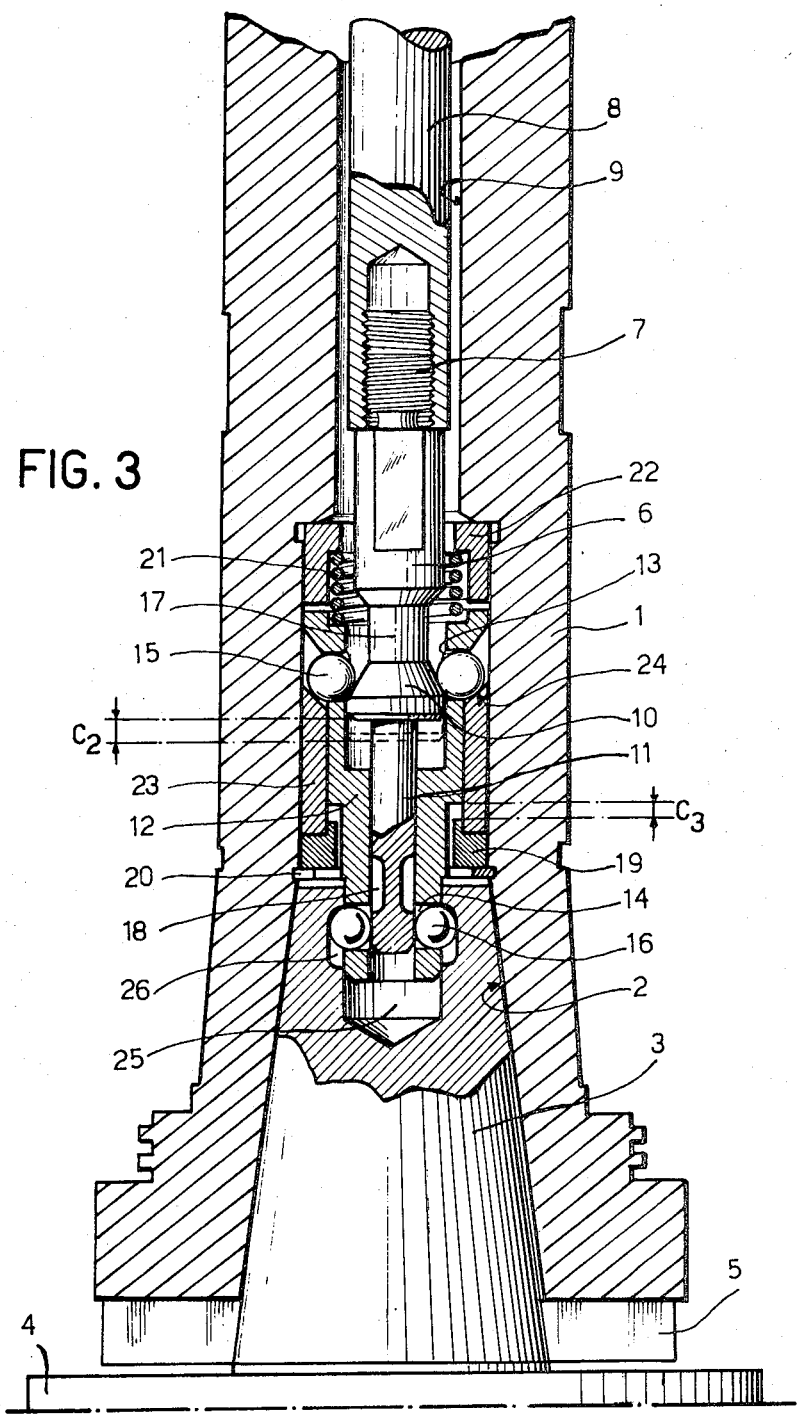
FIG. 3 shows a section of the device similar to that of FIG. 1, but at the end of a second stage of operation, wherein the tool is fully locked on the spindle.

As the displacement of the rod 8 continues, the cone 10 pushes the balls 15 radially outwardly from the bushing 12. Since these balls bear upon the conical seat 24 of the sleeve 23, during their radial displacement they move along the conical surface, remaining substantially in contact therewith. In this manner, the balls 15 lift the bushing 12 away from the ring 19. In this second stage of displacement during which the rod 8 and the driving member 6 accomplish the stroke $C_2$ (FIG. 3), the balls 16 move together with the bushing 12, first taking up the backlash existing between them and the annular space 26 and then pulling the shank 3 until the latter becomes securely seated in the conical seat 2 of the spindle 1. The positions taken by the various components of the locking device at the end of this second stage of displacement are shown in FIG. 3.

It is important to note that, during the second stage of displacement of the rod 8, the speed of movement of the bushing 12 is substantially slower than the speed of displacement of the rod. This is because the balls 15 accomplish a radial outward movement in addition to an axial movement, due to their abutment against the conical seat 24. Thus for a given axial displacement of the cone 10 (FIG. 3), there is not a corresponding, equal axial displacement of the balls 15 and of the bushing 12.

In the embodiment illustrated in the drawings, to an axial displacement $C_2$ of the rod 8 there corresponds a smaller displacement $C_3$ of the bushing 12. The ratio of the speed of the bushing 12 to that of the rod 8, less than 1:1 can be changed, while maintaining constant the dimensions of the device, by simply varying the apex angle of one or both the cones 10 and 24. A ratio of about 0.5:1 has been found suitable and is obtained with the proportions of the embodiment illustrated in the drawings.

In the second stage of displacement of the rod 8, during which the seating of the shank 3 in the conical seat 2 of the spindle 1 takes place, the speed of the shank is noticeably slower than the speed of movement of the rod 8, so that the shocks and therefore the damage that may occur during coupling is noticeably reduced.

In order to unlock the tool, it is sufficient to push the rod 8 in the opposite direction, i.e. toward the tool 4. The cycle of operations described above then takes place in reverse.

The axial displacement of the rod 8 relative to the spindle 1 can be accomplished in any known manner. Preferably, the axial force exerted by the rod 8, at the end of the locking step of the tool, is generated by a coil spring (not shown), one end of which abuts against a shoulder of the spindle, while the other end rests upon an abutment which is integral with the rod. A hydraulic cylinder whose piston is connected with the abutment acts against the spring to push the rod 8 in when required.

I claim:

1. A device for locking a tool to a spindle of a machine tool for driving the tool about an axis of rotation, including:

a rod mounted within the spindle having an axis common to the axis of rotation and adapted to be displaced axially relative to the spindle;

a bushing coaxial with said rod mounted between said rod and said spindle and adapted to be displaced axially relative to said rod and said spindle;

a first set of balls normally housed in corresponding radial holes of said bushing adjacent said rod, said rod including means for displacing said balls radially relative to said rod into recesses in said tool whereby said spindle is locked to said tool;

a second set of balls mounted in corresponding holes of said bushing adjacent to a section of said rod;

a first cam integral with said rod and adjacent to said rod section; and a second stationary cam adjacent said bushing and fixed relative to said spindle, said first and second cams cooperating to displace said second set of balls radially and axially relative to the spindle so that said bushing moves coaxially with said rod at a reduced rate of speed relative to said rod.

2. A device as claimed in claim 1 wherein each of said first and second cams are of conical shape.

3. A device as claimed in claim 1 including spring means adjacent said rod and abutting one end of said bushing and a shoulder of said spindle for biasing said bushing into a first position relative to said rod.

4. A device as claimed in claim 3 wherein each of said first and second cams are of conical shape.

5. A device as claimed in claim 3 including a ring coaxial with said rod and axially secured to said spindle, and a sleeve adjacent and external to said bushing and resting on said ring, said sleeve being fixed relative to said spindle and including said stationary cam, and wherein said spring means bias a second end of said bushing against said ring.

6. A device as claimed in claim 4 including a ring axially secured to said spindle and adapted to serve as a stop for said bushing, and a sleeve adjacent and external to said bushing and resting on said ring, said sleeve being fixed relative to said spindle and including said stationary cam.

* * * * *